United States Patent
Mori

(10) Patent No.: US 8,540,334 B2
(45) Date of Patent: Sep. 24, 2013

(54) IMAGE FORMING APPARATUS AND METHOD

(75) Inventor: Shinya Mori, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 413 days.

(21) Appl. No.: 13/042,328

(22) Filed: Mar. 7, 2011

(65) Prior Publication Data

US 2011/0242179 A1 Oct. 6, 2011

Related U.S. Application Data

(60) Provisional application No. 61/321,018, filed on Apr. 5, 2010.

(51) Int. Cl.
*B41J 29/38* (2006.01)

(52) U.S. Cl.
USPC .............................. 347/16; 347/104

(58) Field of Classification Search
USPC .......................................................... 347/16
See application file for complete search history.

(56) References Cited

U.S. PATENT DOCUMENTS 6,108,513 A * 8/2000 Landa et al. ................. 399/384
2008/0238959 A1* 10/2008 Kato et al. ........................ 347/8

* cited by examiner

*Primary Examiner* — Manish S Shah
*Assistant Examiner* — Jeffrey C Morgan
(74) *Attorney, Agent, or Firm* — Patterson & Sheridan L.L.P.

(57) ABSTRACT

Certain embodiments provide an image forming apparatus including: a paper feed section; an image forming section; a transport mechanism; a sheet sensor which detects leading and trailing edges of the sheet; a sensor power source which supplies electric power to the sheet sensor; a detecting section which specifies the position of the sheet based on the position of the sheet sensor in a transport path and a detection output from the sheet sensor; and a driving control section which generates a timing signal indicating a first detection period when a leading edge of the sheet is detected and a timing signal indicting a second detection period when a trailing edge of the sheet is detected, turns on the sensor power source in the first detection period and the second detection period, and turns off the sensor power source in a period different from the respective detection periods.

20 Claims, 10 Drawing Sheets

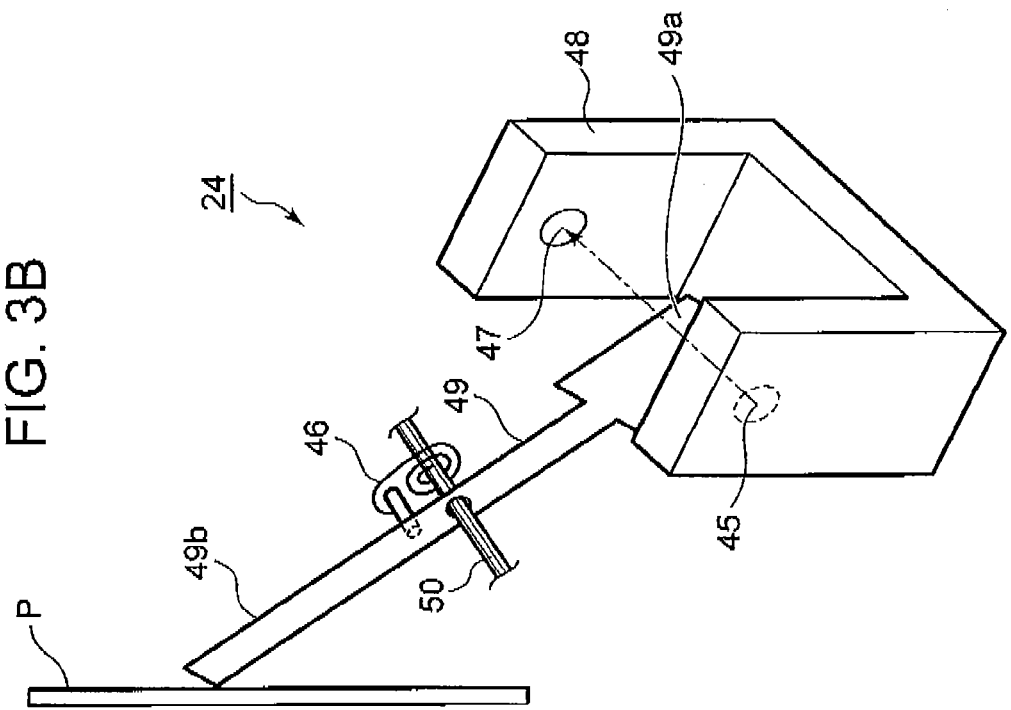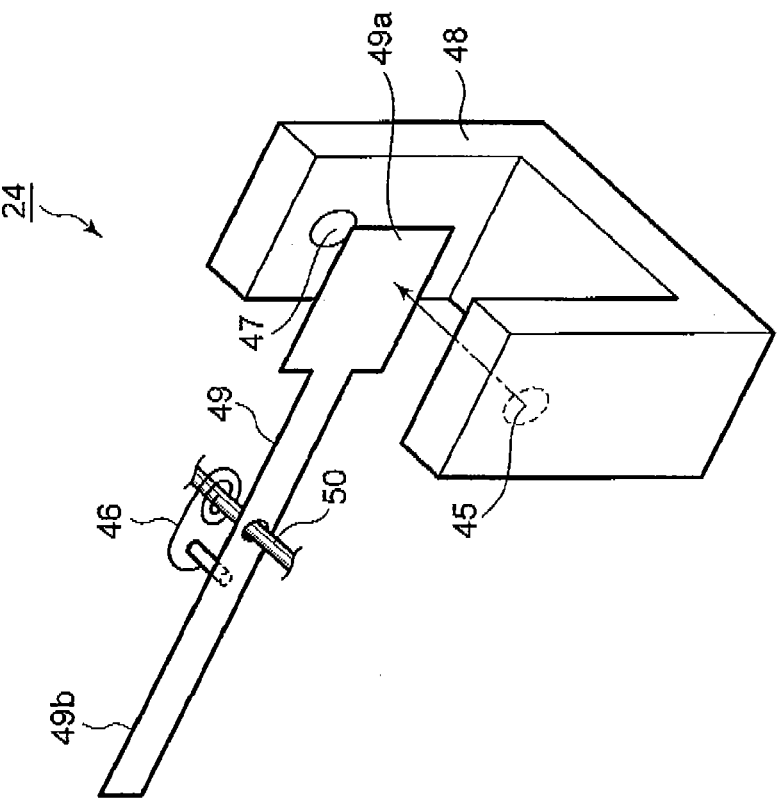

IMAGE FORMING APPARATUS AND METHOD

CROSS-REFERENCE TO RELATED APPLICATION

The present application claims priority under 35 U.S.C. 119 to U.S. Provisional Application Ser. No. 61/321,018, filed on Apr. 5, 2010, the entire disclosure of which is incorporated herein by reference.

FIELD

Embodiments described herein relate to an image forming apparatus and a method of controlling electric power supply to a sensor.

BACKGROUND

An image forming apparatus includes a plurality of sheet sensors in a sheet path. The sheet sensors represent a paper feed sensor, a resist sensor, a paper ejection sensor, and the like. The image forming apparatus determines timings of image forming by outputs of the sheet sensors. The image forming apparatus detects the occurrence of jamming by the respective sensor outputs.

The image forming apparatus always supplies electric power to the sheet sensors. The various sheet sensors are supplied with electric power irrespective of whether they are to transport a sheet or not. The image forming apparatus requires energy saving.

Conventionally, there is known an image forming apparatus which is configured to achieve electric power saving. The image forming apparatus prevents electric power supply to the sheet sensors. When the image forming is not performed, the image forming apparatus turns off power sources used when the image is formed.

As an example of how to realize electric power saving, when the temperature of a fixing unit does not reach a regulated temperature, an image forming apparatus is known which stops the electric power supply to the sheet sensors used when the image is formed.

However, in an operation (printing) during image forming, the image forming apparatus turns on the power sources of the sheet sensors so that they are on all the time. In the printing operation, the image forming apparatus requires the largest electric power. The image forming apparatus cannot reduce the electric power in the printing operation.

The image forming apparatus cannot reduce the output capacity of a low voltage power supply unit required for the apparatus. The low voltage power supply unit represents electric power sources to an electrical circuit substrate, motors and sensors. The image forming apparatus cannot reduce the cost due to the low voltage power supply unit. The image forming apparatus has a problem in that the electric power saving in the printing operation cannot be achieved.

BRIEF DESCRIPTION OF THE DRAWINGS

FIGS. 3A and 3B are perspective views illustrating a sheet sensor in different states, used in the image forming apparatus according to the first embodiment;

FIGS. 6A to 6I are time charts illustrating a sequence of timings when sheet sensor power sources used in the image forming apparatus according to the first embodiment are turned on;

FIGS. 8A to 8I are time charts illustrating a sequence of timings when sheet sensor power sources used in an image forming apparatus according to a second embodiment are turned on;

DETAILED DESCRIPTION

Figure 1:
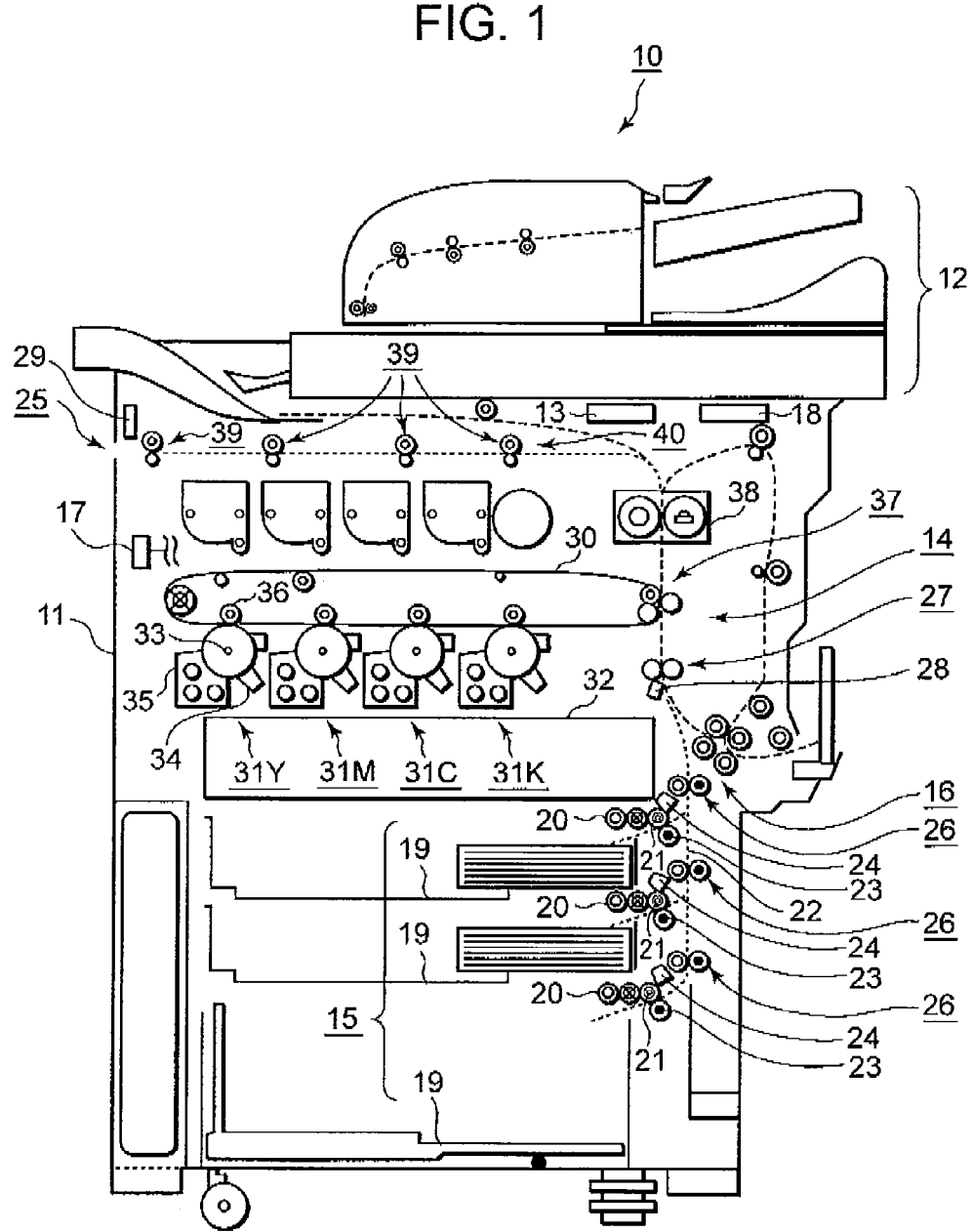
FIG. 1 is a diagram illustrating a configuration of an image forming apparatus according to a first embodiment.

Certain embodiments provide an image forming apparatus including: a paper feed section configured to set a plurality of sheets; an image forming section configured to form an image on the sheet; a mechanism configured to transport the sheet in a transport path defined from the paper feed section to a sheet paper ejection port through the image forming section; a sheet sensor configured to detect a leading edge and a trailing edge of the sheet in the transport path; a sensor power source configured to supply electric power to the sheet sensor; a detecting section configured to specify the position of the sheet transported by the mechanism based on the position of the sheet sensor in the transport path and a detection output from the sheet sensor; and a driving control section configured to generate a timing signal indicating a first detection period when a leading edge of the sheet is detected and a timing signal indicating a second detection period when a trailing edge of the sheet is detected, by the sheet position, turn on the sensor power source in the first detection period and the second detection period, and turn off the sensor power source in a period different from the respective detection periods.

Hereinafter, an image forming apparatus and a method of controlling electric power supply to a sensor will be described in detail with reference to the accompanying drawings. In the respective drawings, same elements are given same reference numerals, and repetitive description will be omitted.

(First Embodiment)

An image forming apparatus according to a first embodiment has a control function of reducing electric power consumption of a plurality of sheet sensors.

A method of controlling the electric power supply to the sensors according to the first embodiment is a method of turning on the electric power supply to the sheet sensors only when a leading edge and a trailing edge of a sheet pass through the sheet sensors.

FIG. 1 is a diagram illustrating a configuration of a digital multi function peripheral. An MFP (multi function peripheral) 10 includes a body 11, a scanning section 12, an image processing section 13, a printing process section 14, a paper feed section 15, a transport mechanism 16 (mechanism), a power source section 17 and a control section 18.

The scanning section 12 optically scans an original document surface. The scanning section 12 converts read image information into an analog signal. The image processing section 13 converts three color image data from the scanning section 12 into four printing colors. The printing process section 14 forms an image on the sheet and outputs the sheet.

The paper feed section 15 supplies the sheet to the printing process section 14.

The paper feed section 15 includes a three-staged paper feed cassette 19, pickup rollers 20, separation rollers 21, transport rollers 23, and paper feed sensors (sheet sensors).

Each paper feed cassette 19 is set with a sheet. The separation rollers 21 separate the sheets picked up by the pickup rollers 20 one by one. The transport rollers 23 send the sheet to a sheet path 22 (transport path). The paper feed sensor 24 detects whether the sheet is sent by the paper feed cassette 19.

The paper feed section 15 notifies the control section 18 of information on the size of the sheet in the paper feed cassette 19 or information on the size of the sheet to be fed, or the like.

The sheet path 22 is a space where the sheet passes. The sheet path 22 is defined by a sheet guide and a gap between rollers. The sheet path 22 is connected to the sheet path 40 (transport path). The sheet path 40 is a path from the printing process section 14 to a paper ejection port 25.

The transport mechanism 16 is a paper feed mechanism section which corrects a skew of the sheet and performs a timing adjustment. The transport mechanism 16 transports the sheet from the paper feed section 15 to an aligning position.

The transport mechanism 16 transports the sheet at a paper feed speed through the sheet path 22. The transport mechanism 16 sends the sheet at a process speed toward a nip of a transfer belt.

The transport mechanism 16 includes a plurality of pairs of transport rollers 26, resist rollers 27, and a resist sensor 28 (sheet sensor).

The transport rollers 26 transport the sheet.

The resist rollers 27 align the sheet and correct the skew. The resist rollers 27 transfer the sheet to the printing process section 14 according to the image forming timing.

The resist sensor 28 detects the presence or absence of a sheet in the resist rollers 27.

Further, the MFP 10 includes a paper ejection sensor 29 (sheet sensor) right in front of the paper ejection port 25. The paper ejection sensor 29 detects the presence or absence of the sheet.

The power source section 17 converts electric power supplied from a commercial alternating current power source into a plurality of direct current voltages and alternating current voltages each having different levels.

The power source section 17 generates high voltage power and low voltage power. The high voltage power supplies voltage to a charging unit, a developing unit and a transfer unit. The low voltage power supplies electric power to a circuit substrate, motors and sensors. The low voltage power is sensor electric power supplied to the sheet sensors.

The control section 18 is a main control section which controls the entire operation of the MFP 10. The control section 18 generates a print job. The control section 18 transports the sheet to the transport mechanism 16. The control section 18 controls the printing process section 14 to form an image on the sheet.

The control section 18 includes a CPU (central processing unit), a ROM (read only memory), and a RAM (random access memory).

The printing process section 14 will be further described.

The printing process section 14 includes an intermediate transfer belt 30, image forming sections 31Y, 31M, 31C and 31K of yellow (Y), magenta (M), cyan (C) and black (K) respectively, and a laser exposure device 32.

The image forming section 31Y includes a photoconductive drum 33, a charging unit 34, a developing unit 35, and a transfer unit 36.

The photoconductive drum 33 holds a latent image. The electric charger 34 uniformly charges the photoconductive drum 33. The laser exposure device 32 forms the latent image on the photoconductive drum 33. The developing unit 35 develops the latent image on the photoconductive drum 33. The transfer unit 36 transfers a developer image on the photoconductive drum 33 to the intermediate transfer belt 30.

Configurations of the image forming sections 31M, 31C and 31K are substantially the same as the configuration of the image forming section 31Y.

Further, the MFP 10 includes a pair of secondary transfer rollers 37 and a fixing unit 38.

The secondary transfer rollers 37 transfer a toner image on the intermediate transfer belt 30, onto the sheet which is pulled up by the transport mechanism 16. The fixing unit 38 fixes the toner image on the sheet. The fixing unit 38 transports and outputs the sheet at a speed instructed by the control section 18.

The MFP 10 includes a plurality of pairs of paper ejection rollers 39 at an output side of the fixing unit 38.

The printing process section 14, the fixing unit 38, the paper ejection rollers 39 and the paper ejection port 25 form the sheet path 40 on a downstream side of the printing process section 14, in the sheet transport direction.

Figure 2:
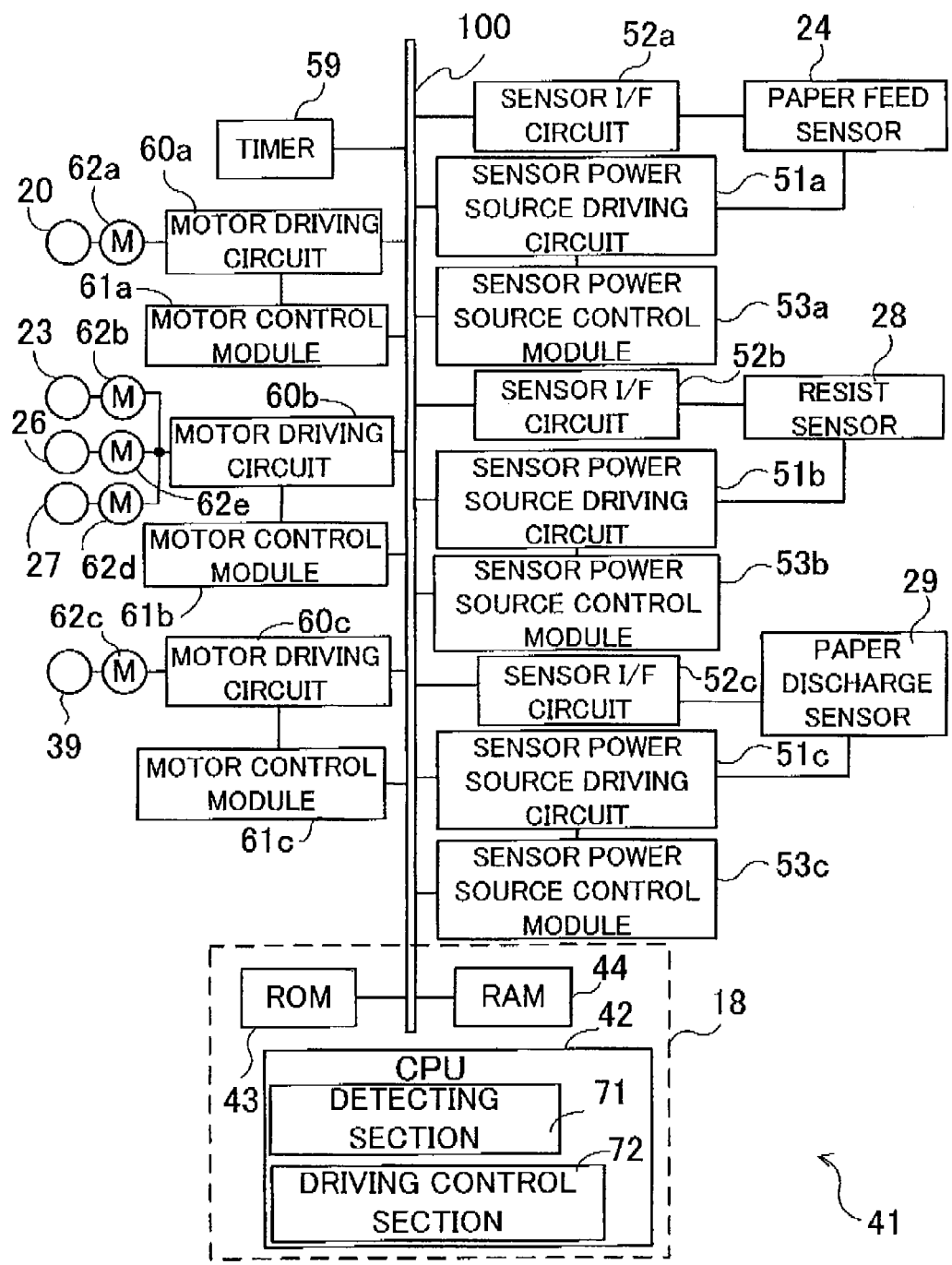
FIG. 2 is a block diagram illustrating a control system of the image forming apparatus according to the first embodiment.

FIG. 2 is a block diagram illustrating a control system which mainly has a detecting function of the sheet position. The reference numerals represent the same elements.

The control system 41 includes the control section 18, the paper feed sensor 24, the resist sensor 28 and the paper ejection sensor 29.

Control contents in the control system 41 include transport of the sheet, turning on or off of the respective power sources of the paper feed sensor 24, the resist sensor 28 and the paper ejection sensor 29, and detection of the sheet position through the paper feed sensor 24, the resist sensor 28 and the paper ejection sensor 29.

An important consideration of the control is that any power source of the paper feed sensor 24, the resist sensor 28 and the paper ejection sensor 29 is turned on for a desired detection period, and any of the the sheet sensors (paper feed sensor 24, the resist sensor 28 and the paper ejection sensor 29) which is supplied with electric power detects the sheet at the sensor position in the detection period.

The control section 18 mainly includes a bus 100, the CPU 42, the ROM 43 and the RAM 44 as hardware.

The CPU 42 performs a control. The ROM 43 is an FROM (flash read only memory) which stores a program. The RAM 44 is an SRAM (static random access memory) which stores data for a work process.

The control section 18 functions as a detecting section 71.

The detecting section 71 transports the sheet to the transport mechanism 16, and specifies the sheet position of the sheet by the respective positions of the paper feed sensor 24, the resist sensor 28 and the paper ejection sensor 29 in the sheet paths 22 and 40 and by the respective detection outputs from the paper feed sensor 24, the resist sensor 28 and the paper ejection sensor 29.

The control section 18 functions as a driving control section 72. The driving control section 72 generates a timing signal indicating a first detection period ($F1s$, $F2s$ and $F3s$ which will be described later) in which a leading edge of the sheet is detected, and a timing signal indicating a second detection period (F1e, F2e and F3e which will be described later) in which a trailing edge of the sheet is detected, by the sheet position.

The driving control section 72 turns on a switching transistor 55 in the first and the second detection periods. The driving control section 72 turns off the switching transistor 55, in a period which is different from the first and second detection periods.

The paper feed sensor 24 is a photo-interrupter with an actuator, for example.

FIGS. 3A and 3B are perspective views illustrating the paper feed sensor 24. FIG. 3A illustrates an example in which the sheet is not detected. FIG. 3B illustrates an example in which the sheet is detected. The same reference numerals represent the same elements.

The paper feed sensor 24 includes a light emitting diode 45, a case 48 including a photo transistor 47, an arm shaped actuator 49 having a position where light beams are passed and a position where light beams are blocked.

The light emitting diode 45 has a state where the electric power is supplied to the light emitting diode 45 and a state where the electric power is not supplied. The CPU 42 controls the two states. The paper feed sensor 24 transmits signals to the CPU 42 or receives the signals from the CPU 42, through the control substrate.

A sensitivity direction of the photo transistor 47 directs toward the light emitting diode 45. The photo transistor 47 outputs electric current of a size according to the light receiving intensity.

The paper feed sensor 24 is configured so that the center of the actuator 49 is supported on a horizontal bar 50 to be able to rotate. An initial position of the rotation of the bar 50 is locked by a spring 46. The actuator 49 includes a wide side 49a and an edge 49b with which the sheet is in contact.

The edge 49b is in a state where a pull force is applied thereto downwardly by the spring 46. When the force is not applied to the actuator 49, the side 49a is in a position where the light beams are blocked. In the state of FIG. 3A, the paper feed sensor 24 has a circuit which outputs "high".

When the sheet is not close to the edge 49b, as shown in FIG. 3A, the side 49a blocks the light beams from the light emitting diode 45. The paper feed sensor 24 outputs "high".

When the sheet P passes through the edge 49b, as shown in FIG. 3B, the actuator 49 rotates. The side 49a directs the light beams to the photo resister 47. The paper feed sensor 24 outputs "low". In the state of FIG. 3B, the paper feed sensor 24 has a circuit which outputs "low".

The configuration of the resist sensor 28 is substantially the same as the configuration of the paper feed sensor 24. The configuration of the paper ejection sensor 29 is substantially the same as the configuration of the paper feed sensor 24.

In FIG. 2, the control system 41 includes a sensor power source driving circuit 51a (first sensor power source driving circuit), a sensor interface circuit (sensor I/F circuit) 52a, and a sensor power source control module 53a.

The sensor power source driving circuit 51a turns on or off the electric power supply to the paper feed sensor 24.

Figure 4:
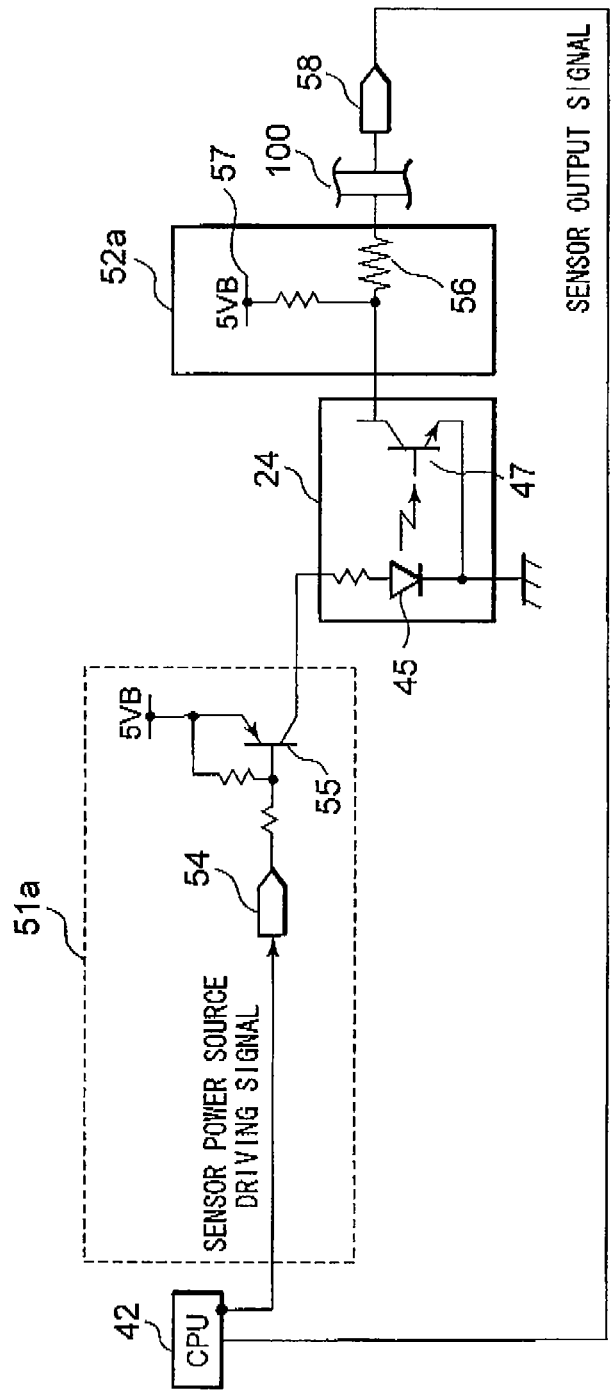
FIG. 4 is a diagram illustrating a configuration example of a sensor power source driving circuit used in the image forming apparatus according to the first embodiment.

FIG. 4 is a diagram illustrating a configuration example of the sensor power source driving circuit 51a. The reference numerals represent the same elements. FIG. 4 also illustrates the sensor interface circuit 52a and the CPU 42.

The sensor power source driving circuit 51a includes a port 54 and a switching transistor 55 (sensor power source).

The port 54 receives a sensor power source driving signal. The CPU 42 on a main substrate outputs the sensor power source driving signal. Alternatively, the CPU 42 outputs the signal through a driver on a control substrate.

The switching transistor 55 outputs a low voltage power by a low sensor power source driving signal. The switching transistor 55 supplies the low voltage power (for example, voltage of 5V) to the paper feed sensor 24. The low voltage power from the switching transistor 55 functions as the sensor electric power supplied to the paper feed sensor 24.

The sensor interface circuit 52a is a pull-up circuit for monitoring an electric current signal output by the photo transistor 47 as a voltage signal.

The sensor interface circuit 52a includes a resistor 56 for removing noise, and a pull-up terminal 57 which is connected to the resistor 56.

The sensor interface circuit 52a includes an input terminal connected to a collector terminal of the photo transistor 47 and an output terminal connected to the bus 100.

The sensor interface circuit 52a outputs a sensor output signal. An input port 58 of the CPU 42 is read through an LSI (large scale integration) or an exclusive IC (integrated circuit), or is directly read by firmware. The firmware represents a program executed by the CPU 42.

The CPU 42 drives a sensor power source driving signal at a low level, and thus, electric power is supplied to the light emitting diode 45 of the paper feed sensor 24. The CPU 42 validates functions of the paper feed sensor 24.

Logic of the sensor output of the paper feed sensor 24 includes the following (L1), (L2) and (L3).

(L1) In a case where the sensor power source driving circuit 51a is turned off, the paper feed sensor 24 does not consume electric power. The output terminal of the paper feed sensor 24 indicates "high".

(L2) In a case where the sensor power source driving circuit 51a is turned on and the sheet is not present in the paper feed sensor 24, the paper feed sensor 24 is supplied with electric power. The paper feed sensor 24 is in an initial state. The output terminal of the paper feed sensor 24 indicates "high".

(L3) In a case where the sensor power source driving circuit 51a is turned on and the sheet reaches the paper feed sensor 24, the paper feed sensor 24 is supplied with electric power. The light beams reach the photo transistor 47 by the rotation of the actuator 49. The output logic of the paper feed sensor 24 indicates "low".

That is, while the paper feed sensor 24 is driven, the paper feed sensor 24 notifies the CPU 42 of the non-blocking when the sheet is present, and the paper feed sensor 24 notifies the CPU 42 of the blocking when the sheet is not present, by the photo-interrupter.

Returning to FIG. 2, the sensor power source control module 53a turns on or off the sensor power source driving circuit 51a. The sensor power source control module 53a may be an LSI, an exclusive IC or a part of functions in the CPU 42.

On the input and output sides of the resist sensor 28, the control system 41 includes a sensor power source driving circuit 51b (second sensor power source driving circuit), a sensor interface circuit 52b and a sensor power source control module 53b.

On the input and output sides of the paper ejection sensor 29, the control system 41 includes a sensor power source driving circuit 51c (third sensor power source driving circuit), a sensor interface circuit 52c and a sensor power source control module 53c.

The sensor power source driving circuits 51b and 51c are substantially the same as the sensor power source driving circuit 51a.

The sensor interface circuits 52b and 52c are substantially the same as the sensor interface circuit 52a.

The sensor power source control modules 53b and 53c are substantially the same as the sensor power source control module 53a.

The control system 41 includes a timer 59. The timer 59 creates timing signals of on and off of the sensor power source driving circuits 51a, 51b and 51c, respectively.

Further, the control system 41 includes a motor driving circuit 60a and a motor driving module 61a. The motor driving circuit 60a controls a motor 62a. The motor 62a rotates the pickup rollers 20. The motor driving module 61a turns on or off the motor driving circuit 60a.

The control system 41 includes a motor driving circuit 60b and a motor driving module 61b. The motor driving circuit 60b controls a motor (paper feed motor) 62b, a motor (resist motor) 62d, and a motor (transport motor) 62e.

The motor 62b rotates the transport rollers 23. The motor 62d rotates the resist rollers 27. The motor 62e rotates the transport rollers 26.

The motor driving module 61b turns on or off the motor driving circuit 60b.

The control system 41 includes a motor driving circuit 60c and a motor driving module 61c. The motor driving circuit 60c controls a motor (paper ejection motor) 62c. The motor 62c rotates the paper ejection rollers 39. The motor driving module 61c turns on or off the motor driving circuit 60c.

The ROM 43 stores information on the distance between respective segments in advance. The sheet path 22 includes a plurality of segments. The sheet path 40 also includes a plurality of segments.

The distances of the segments include the distance between the pickup rollers 20 and the paper feed sensor 24, the distance between the paper feed sensor 24 and the transfer rollers 26, and the distance between the transport rollers 26 and the resist sensor 28.

The distances between the segments includes the distance between the resist sensor 28 and the fixing unit 38, the distance between the fixing unit 38 and the paper ejection rollers 39, and the distance between the paper ejection rollers 39 and the paper ejection sensor 29.

The CPU 42 continuously detects the sheet by the information in the ROM 43 and the sensor output from the paper feed sensor 24, the resist sensor 28 and the paper ejection sensor 29.

Figure 5:
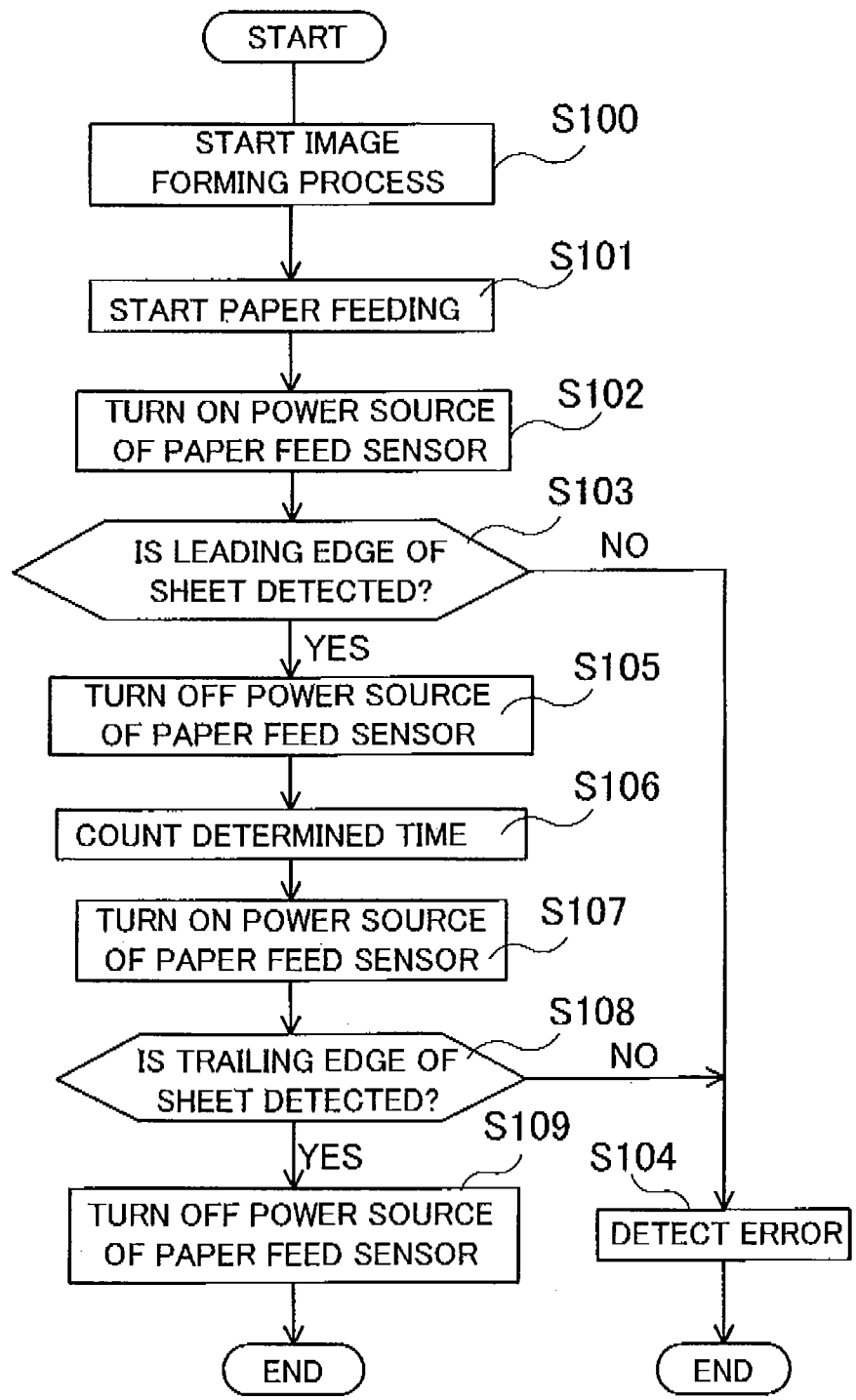
FIG. 5 is a flowchart illustrating a method of controlling electric power supply to a sensor according to the first embodiment.

FIG. 5 is a flowchart illustrating a method of controlling electric power supply to a sensor by the MFP 10.

In the method of controlling electric power supply to the sensor through the MFP 10 having the above-described configuration, the timing when the CPU 42 starts the image forming is used as a trigger. Conditions of the image forming start are that there is a print job and the fixing unit 38 reaches a fixing temperature, for example.

In ACT S100, the CPU 42 starts the image forming. The CPU 42 activates the timer 59.

In ACT S101, the CPU 42 starts to rotate the pickup rollers 20. The CPU 42 starts to rotate the paper feed motor 62b. The transport mechanism 16 starts to operate.

In ACT S102, the CPU 42 turns on the power source of the paper feed sensor 24.

In ACT S103, the CPU 42 determines whether the paper feed sensor 24 detects the leading edge of the sheet.

If the paper feed sensor 24 does not detect the leading edge of the sheet, the CPU 42 terminates the process in ACT S104, through a NO route.

If the paper feed sensor 24 detects the leading edge of the sheet, the CPU 42 turns off the power source of the paper feed sensor 24 in ACT S105, through a YES route.

Subsequently, in ACT S106, the CPU 42 counts the determined time. For example, the CPU 42 counts the time by the number of steps of a stepping motor.

Then, in ACT S107, the CPU 42 again turns on the power source of the paper feed sensor 24.

In ACT S108, the CPU 42 determines whether the paper feed sensor 24 detects the trailing edge of the sheet.

If the paper feed sensor 24 does not detect the trailing edge of the sheet, the CPU 42 terminates the process in ACT S104, through the NO route.

If the paper feed sensor 24 detects the trailing edge of the sheet, the CPU 42 turns off the power source of the paper feed sensor 24 in ACT S109, through the YES route. Then, the CPU 42 terminates the process.

Hereinbefore, the sheet detecting method has been described.

Hereinafter, when the MFP 10 transports the sheet from the paper feed section 15 to the paper ejection port 25, driving timings of the various motors and sensors in the transport mechanism 16 will be described.

FIGS. 6A to 6I are time charts illustrating a sequence of the timings when the respective power sources of the paper sheet sensor 24, the resist sensor 28 and the paper ejection sensor 29 are turned on when the sheet is transported. Respective waveforms represent changes in voltage signals as time passes.

Here, "low" represents driving, and "high" represents non-driving. The CPU 42 switches the "high" and "low".

Periods (F1s, F1e, F2s, F2e, F3s and F3e) are all detection periods in which detection is performed by the CPU 42. Numbers "1", "2" and "3" among suffixes correspond to the paper feed sensor 24, the resist sensor 28 and the paper ejection sensor 29, respectively. Here, "s" represents a start position of the sheet, and "e" represents an end position of the sheet.

(a) Driving of Power Source of Paper Feed Sensor 24

Figure 6:
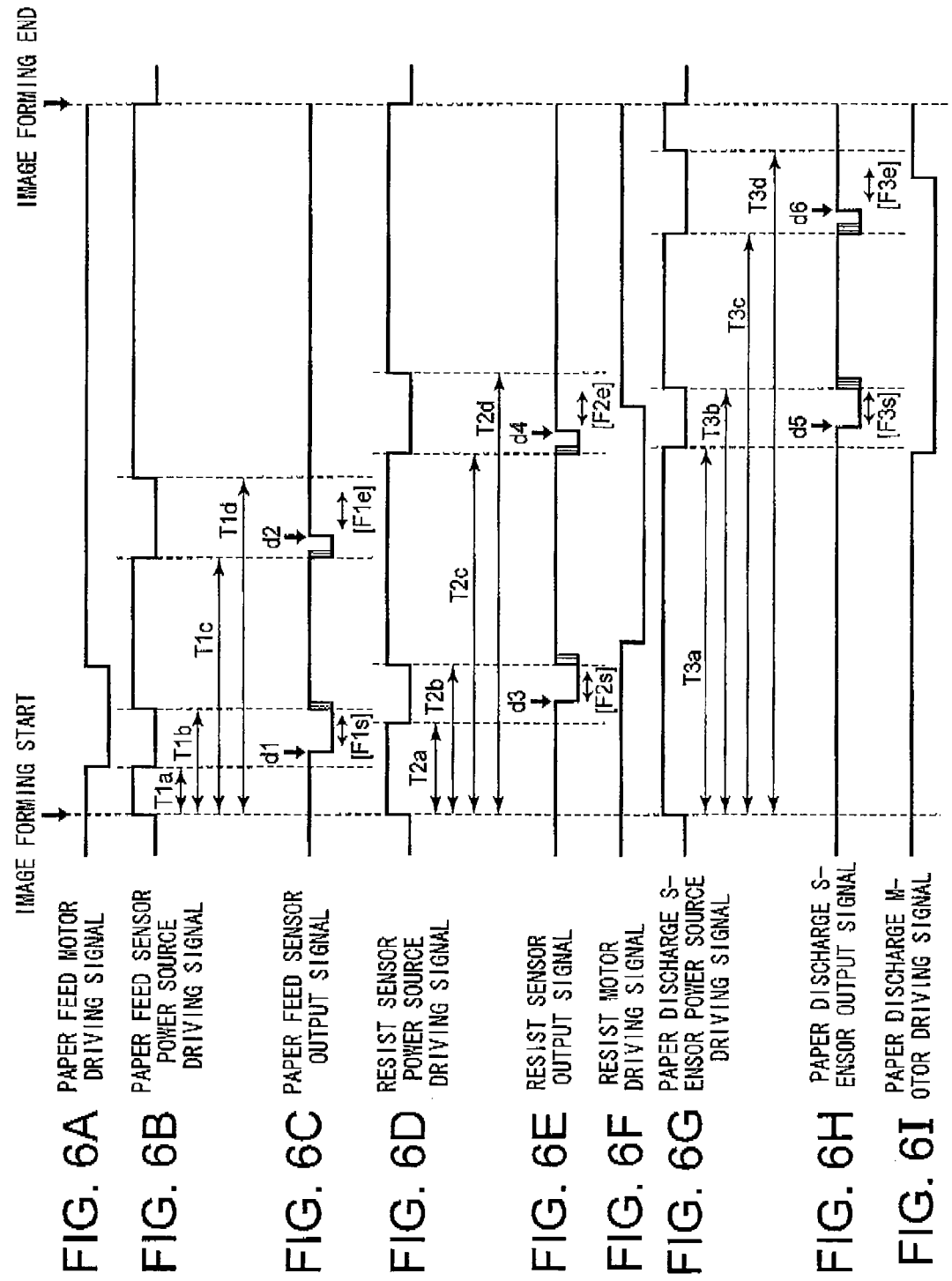

FIG. 6A illustrates a timing of a signal which drives the paper feed motor 62b. Here, "low" represents that the motor is being operated and "high" represents that the motor is stopped.

FIG. 6B illustrates a timing of a signal (paper feed sensor power source driving signal) which drives the power source of the paper feed sensor 24. Here, "high" represents that the power source is not supplied, and "low" represents that the power source is supplied.

FIG. 6C illustrates an example of a timing of a signal output by the paper feed sensor 24. Here, "low" represents the presence of the sheet, and "high" represents the absence of the sheet.

FIG. 6C also illustrates the periods F1s and F1e of the time when the CPU 42 reads the output signal. Here, the period F1s is a period for detecting the leading edge of the sheet. The period F1e is a period for detecting the trailing edge of the sheet.

As shown in FIG. 6A, if a time T1a elapses from the image forming start, the CPU 42 applies electric power to the paper feed motor 62b. The time T1a is a time required until the sheet reaches the transfer rollers 23 after being fed from the paper feed section 16. The CPU 42 measures the time T1a from the image forming start.

As shown in FIG. 6B, at the time of the image forming start, the CPU 42 switches the paper feed sensor power source driving signal from "low" to "high". If the time T1a elapses from the image forming start, the CPU 42 switches the paper feed sensor power source driving signal from "high" to "low".

As the paper feed sensor power source driving signal becomes low, electric power is supplied to the paper feed sensor 24. Accordingly, the function of the paper feed sensor 24 is validated. Further, electric power is supplied to the light emitting diode 45.

As shown in FIG. 6C, the paper feed sensor 24 continuously outputs "high". At the time d1, the paper feed sensor 24 detects the leading edge of the sheet, and then, the paper feed sensor 24 changes the sensor value from "high" to "low".

In the period F1s, the CPU 42 determines whether the leading edge of the sheet is present in the paper feed sensor 24. The time interval of the F1s is a set value stored in the ROM 43 in advance.

The paper feed sensor 24 continuously outputs a signal indicating the sheet detection while the sheet is detected. After the trailing edge of the sheet is detected, the CPU 42 continuously monitors the paper feed sensor 24 until the period F1s ends. After a time T1b elapses from the image forming start, the CPU 42 turns off the power source of the paper feed sensor 24.

Then, the CPU 42 turns off the power source, such that it is continuously off, of the paper feed sensor 24 until a time T1c elapses from the image forming start.

The CPU 42 calculates the time T1c using the sheet size information stored in the ROM 43 and the transport speed information from the motor control module 61b.

Next, the CPU 42 performs the detection of the trailing edge of the sheet.

At the time T1c, the CPU 42 sets the paper feed sensor power source driving signal to "low", again. The electric power is supplied to the paper feed sensor 24. After an output indefinite period elapses, the paper feed sensor 24 outputs a low value.

At the time d2 in FIG. 6C, the trailing edge of the sheet passes through the paper feed sensor 24, and then, the paper feed sensor 24 changes the sensor value from "low" to "high".

In the period of F1e, the CPU 42 determines whether the trailing edge of the sheet is present in the paper feed sensor 24. The time interval of F1e is a set value stored in the ROM 43 in advance.

The paper feed sensor 24 continuously outputs a signal indicating the sheet detection while the sheet is detected. After the CPU 42 detects that the trailing edge of the sheet passes through the paper feed sensor 24, the CPU 42 continuously monitors the paper feed sensor 24 until the period F1e ends. After a time T1d elapses from the image forming start, the CPU 42 turns off the power source of the paper feed sensor 24.

From the end of the period F1s to the start of the period F1e, the CPU 42 does not monitor the output signal of the paper feed sensor 24. From the elapse of the time T1b to the arrival of the time T1c, the CPU 42 turns off the paper feed sensor power source driving signal. Thus, the consumption power of the paper feed sensor 24 is controlled.

Since the CPU 42 applies electric current to the paper feed sensor 24 only for the two periods of F1s and F1e, the MFP 10 obtains power saving.

(b) Driving of Power Source of Resist Sensor 28

FIG. 6D illustrates a timing of a signal (resist sensor power source driving signal) which drives the power source of the resist sensor 28. FIG. 6E illustrates an example of a timing of a signal output by the resist sensor 28. FIG. 6F illustrates a timing of a signal for driving the resist motor 62d.

The CPU 42 drives the power source of the resist sensor 28 in a similar way to the driving of the power source of the paper feed sensor 24.

After a time T2a elapses from the image forming start, the CPU 42 sets the resist sensor power source driving signal to "low". The electric power is supplied to the resist sensor 28. The resist sensor function is validated.

As shown in FIG. 6E, the resist sensor 28 continuously outputs "high". At the time d3, the resist sensor 28 detects the leading edge of the sheet, and then, the resist sensor 28 changes the sensor value from "high" to "low".

In the period F2s, the CPU 42 determines whether the leading edge of the sheet is present in the resist sensor 28. The time interval of F2s is a set value stored in the ROM 43 in advance.

The resist sensor 28 continuously outputs a signal indicating the sheet detection while the sheet is detected. After the leading edge of the sheet is detected, the CPU 42 continuously monitors the resist sensor 28 until the period F2s ends. After a time T2b elapses from the image forming start, the CPU 42 sets the resist sensor power source driving signal to "high". The power source of the resist sensor 28 is turned off.

Then, the CPU 42 continuously turns off the power source of the resist sensor 28 until a time T2c elapses from the image forming start.

Next, the CPU 42 detects the trailing edge of the sheet.

Then, after the time T2c elapses from the image forming start, the CPU 42 sets the resist sensor power source driving signal to "low", again. The electric power is supplied to the resist sensor 28. The resist sensor 28 starts to output the "low" value.

At the time d4 in FIG. 6E, the resist sensor 28 detects the trailing edge of the sheet, and then, the resist sensor 28 changes the sensor value from "low" to "high".

In the period of F2e, the CPU 42 determines whether the trailing edge of the sheet is present in the resist sensor 28. The time interval of F2e is a set value stored in the ROM 43 in advance.

After the sheet passes through the resist sensor 28, the resist sensor 28 continuously outputs "high". Until the period F2e ends, the CPU 42 continuously monitors the resist sensor 28.

After a time T2d elapses from the image forming start, the CPU 42 sets the resist sensor power source driving signal to "high", again. The power source of the resist sensor 28 is turned off. The power consumption of the power source of the resist sensor 28 is suppressed.

Since the CPU 42 applies electric current to the resist sensor 28 for two periods of F2s and F2e, the power consumption saving is obtained.

(c) Driving of Power Source of Paper Ejection Sensor 29

FIG. 6G illustrates a timing of a signal (paper ejection sensor power source driving signal) which drives the power source of the ejection sensor 29. FIG. 6H illustrates an example of a timing of a signal output by the paper ejection sensor 29. FIG. 6I illustrates a timing of a signal for driving the paper ejection motor 62c.

The CPU 42 drives the power source of the paper ejection sensor 29 in a similar way to the driving of the power source of the paper feed sensor 24.

After a time T3a elapses from the image forming start, the CPU 42 sets the paper ejection sensor power source driving signal to "low". The electric power is supplied to the paper ejection sensor 29. The paper ejection function is validated.

As shown in FIG. 6H, the paper ejection sensor 29 continuously outputs "high". At the time d5, the paper ejection sensor 29 detects the leading edge of the sheet, and then, the paper ejection sensor 29 changes the sensor value from "high" to "low".

In the period F3s, the CPU 42 determines whether the leading edge of the sheet is present in the paper ejection sensor 29. The time interval of F3s is a set value stored in the ROM 43 in advance.

The paper ejection sensor 29 continuously outputs a signal indicating the sheet detection while the sheet is detected. After the leading edge of the sheet is detected, the CPU 42 continuously monitors the paper ejection sensor 29 until the period F3s ends. After a time T3b elapses from the image forming start, the CPU 42 sets the paper ejection sensor power source driving signal to "high". The power source of the paper ejection sensor 29 is turned off.

Then, the CPU 42 continuously turns off the power source of the paper ejection sensor 29 until a time T3c elapses from the image forming start.

Next, the CPU 42 detects the trailing edge of the sheet.

Then, after the time T3c elapses from the image forming start, the CPU 42 sets the paper ejection sensor power source driving signal to "low" again. The electric power is supplied to the paper ejection sensor 29. The paper ejection sensor 29 starts to output the "low" value.

At the time d6 in FIG. 6H, the paper ejection sensor 29 detects the trailing edge of the sheet, and then, the paper ejection sensor 29 changes the sensor value from "low" to "high".

In the period of F3e, the CPU 42 determines whether the trailing edge of the sheet is present in the paper ejection sensor 29. The time interval of F3e is a set value stored in the ROM 43 in advance.

After the sheet passes through the paper ejection sensor 29, the paper ejection sensor 29 continuously outputs "high". Until the period F3e ends, the CPU 42 continuously monitors the paper ejection sensor 29.

After a time T3d elapses from the image forming start, the CPU 42 sets the paper ejection sensor power source driving signal to "high", again. The power source of the paper ejection sensor 29 is turned off. The power consumption of the power source of the paper ejection sensor 29 is suppressed.

Since the CPU 42 applies electric power to the paper ejection sensor 29 for only two periods of F3s and F3e, the power consumption saving is obtained.

The MFP 10 has periods where the paper feed sensor 24, the resist sensor 28 and the paper ejection sensor 29 are not identified under the control of the CPU while the sheet is transported. Out the respective periods (F1s, F1e, F2s, F2e, F3s and F3e), the MFP 10 doesn't need to turns on the respective sensor power sources.

During the image forming in which the largest electric power is required, the MFP 10 can suppress the consumption of the secondary side electric current. Here, the "secondary side" means the side which has a load when seen from the power source section 17. The output capacity of the low voltage power source can be reduced and the energy saving effect can be expected.

FIGS. 7A to 7I are time charts illustrating driving timings of sheet sensor power sources used in an image forming apparatus in the related art. The types of the signals indicated by FIGS. 7A to 7I correspond to those of FIGS. 6A to 6I.

Figure 7:
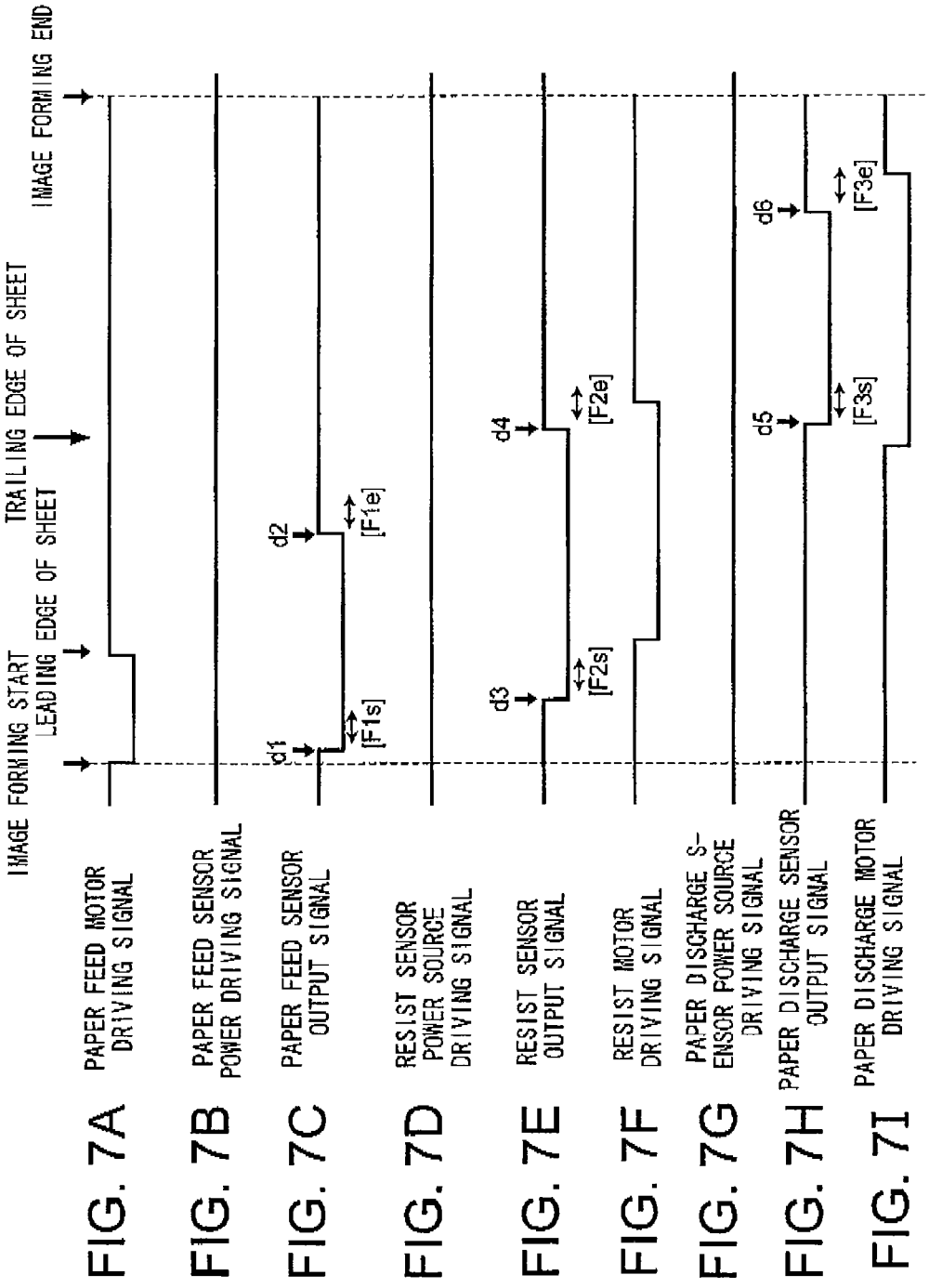
FIGS. 7A to 7I are time charts illustrating driving timings of sheet sensor power sources used in an image forming apparatus in the related art.

FIGS. 7A, 7F and 7I illustrate timings when the respective motors on the sheet path from the paper feed to the paper ejection are driven.

FIGS. 7B, 7D and 7G illustrate timings when power sources of the respective sensors (paper feed sensor, resist sensor and paper ejection sensor) are driven.

FIGS. 7C, 7E and 7H illustrate a sequence of output timings of the respective sensors. For comparison, in FIGS. 7C, 7E and 7H, the periods (F1s, F1e, F2s, F2e, F3s and F3e) in which the apparatus and method according to the embodiment are used are superposed in the respective time waveforms.

As shown in FIGS. 7B, 7D and 7G, the respective sensor power sources are in a turned on state, not by the sensor detection timing of the CPU.

The respective sensors can constantly output the sensor value during the sheet running. For example, the image forming apparatus in the related art outputs the sensor value in which the sheet is present in a low level.

The respective sensors consume electric power in a period which is different from the periods (F1s, F1e, F2s, F2e, F3s and F3e) when the CPU detects the respective sensors.

The image forming apparatus in the related art consumes unnecessary electric power as a whole. Further, it is necessary for a low voltage power source to sufficiently secure the electric power corresponding to the unnecessary electric power as the capacity of the power source. The image forming apparatus in the related art cannot reduce the output capacity of the low voltage power source required for the apparatus, due to its specification.

In contrast, the MFP 10 can reduce the secondary side electric current during the image forming, and can lower the capacity of the low voltage power source. The MFP 10 can obtain lowering of costs and electric power saving. That is, it is possible to reduce the cost and realize the energy saving of the apparatus.

The MFP 10 temporarily turns off the power sources of the paper feed sensor 24, the resist sensor 28 and the paper ejection sensor 29, while the image is being formed and the sheet is being transported. Thus, the electric power of the printing operation can be reduced and the electric power saving can be obtained. In addition, it is possible to reduce the consumption electric current at the time of the secondary side maximum operation. It is possible to realize the lowering of cost of the low voltage power source.

(Second Embodiment)

In the first embodiment, the CPU 42 generates the timings of turning on and off the respective sensor power sources on the basis of the timing of the image forming start. The timings of turning on and off the respective sensor power sources may differ.

In an image forming apparatus according to a second embodiment, the CPU 42 generates the timings of turning on and off the respective sensor power sources on the basis of the timings of turning on the respective motors, the timings of the sheet pass detections, or the like.

The image forming apparatus according to the second embodiment is also the MFP 10. The MFP 10 is substantially the same as the example of the first embodiment, except that the CPU 42 generates timings which are different from the example of the first embodiment.

A sheet detecting method according to the second embodiment is a method of turning on the power sources of the paper feed sensor 24, the resist sensor 28 and the paper ejection sensor 29 only, when the leading edge and the trailing edge of the sheet pass through the paper feed sensor 24, the resist sensor 28 and the paper ejection sensor 29.

FIGS. 8A to 8I are time charts illustrating a sequence of the timings when the respective power sources of the paper sheet sensor 24, the resist sensor 28 and the paper ejection sensor 29 are turned on when the sheet is transported.

In the figures, the same character strings as in FIGS. 6A to 6I indicate the same meanings. The periods (F1s, F1e, F2s, F2e, F3s and F3e) are all detection periods in which detection is performed by the CPU 42.

In the figures, "high" and "low" have the substantially same meanings as the examples in FIGS. 6A to 6I.

(a) Driving of Power Source of Paper Feed Sensor 24

Figure 8:
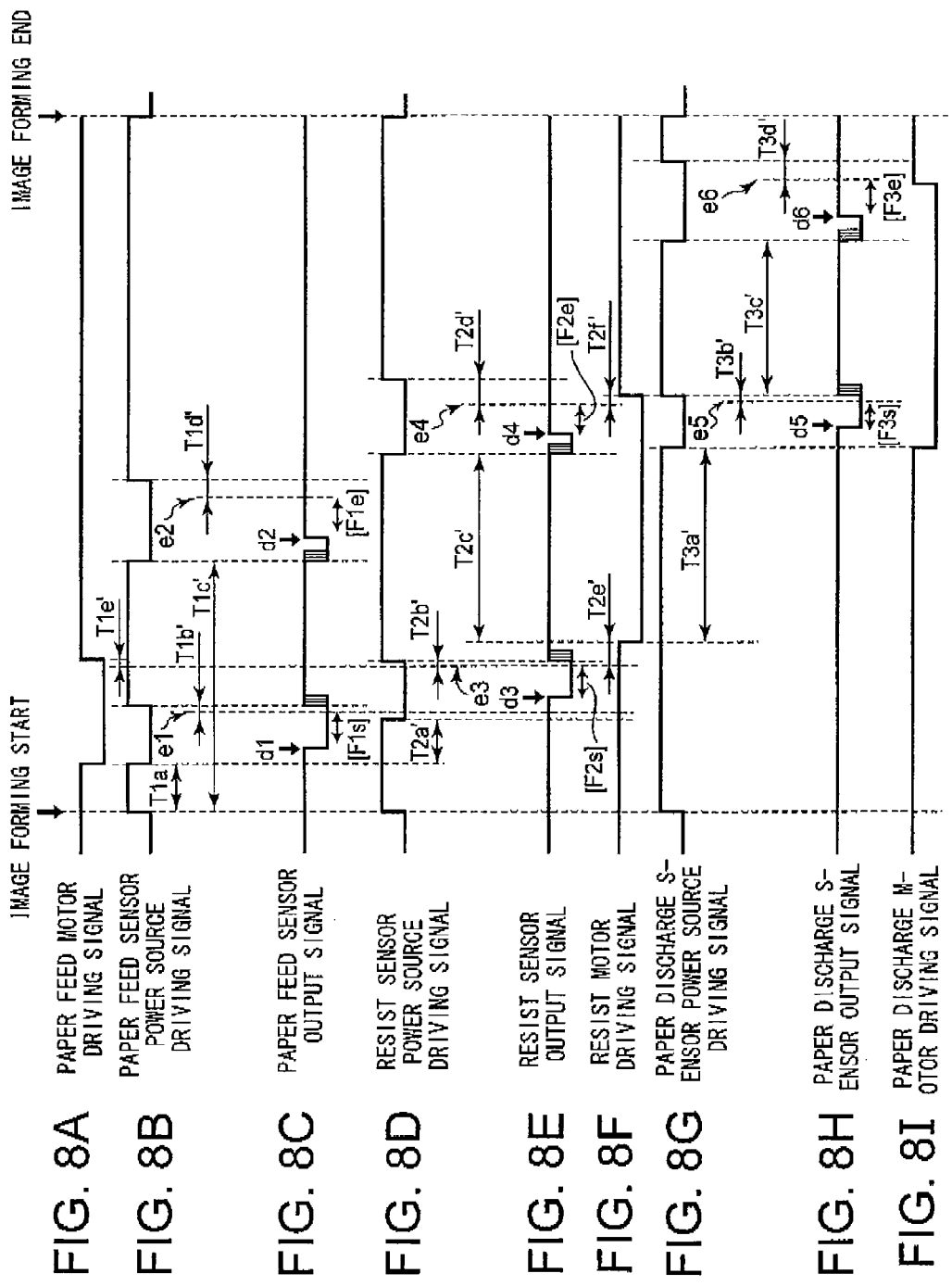

FIG. 8A illustrates a timing of a signal which drives the paper feed motor 62*b*. FIG. 8B illustrates a timing of a paper feed sensor power source driving signal. FIG. 8C illustrates an example of a timing of a signal output by the paper feed sensor 24.

As shown in FIG. 8A, if the time T1*a* elapses from the image forming start, the CPU 42 applies electric current to the paper feed motor 62*b*. As shown in FIG. 8B, the CPU 42 switches the paper feed sensor power source driving signal from "high" to "low", with reference to the paper feed timing by the paper feed motor 62*b*.

As shown in FIG. 8C, the CPU 42 monitors the sensor output in the period of F1*s*. The CPU 42 already confirms the result regarding whether the leading edge of the sheet is detected by the time the period F1*s* ends.

It is not necessary for the CPU 42 to monitor the sensor output by the confirmation at the time point e1. In FIG. 8B, after a time T1*b'* elapses from the confirmed time point e1, the CPU 42 switches the paper feed sensor power source driving signal from "low" to "high". The electric power supply to the paper feed sensor 24 is cut off.

Further, the CPU 42 starts the period F1*e* after a time T1*c'* elapses from the time point e1. A timer 59 starts the period F1*e* for detecting the trailing edge of the sheet after the time T1*c'* elapses from the time point e1.

Next, the CPU 42 detects the trailing edge of the sheet.

As shown in FIG. 8C, the CPU 42 monitors the sensor output in the period F1*e*. The CPU 42 already confirms the result regarding whether the trailing edge of the sheet is detected by the time the period F1*e* ends.

The CPU 42 confirms the result at the time point e2. In FIG. 8B, after a time T1*d'* elapses from the time point e2, the CPU 42 switches the paper feed sensor power source driving signal from "low" to "high". The electric power supply to the paper feed sensor 24 is cut off.

In this way, cumulative errors of the transport timings are absorbed. The errors refer to delay or forwarding of the sheet transport.

Since the CPU 42 changes the timing when the operation of the paper feed sensor 24 is stopped in each case, it is possible to achieve a sufficient margin in the detection timing.

The time T1*c'* (FIG. 8B) is shorter than the time T1*c* (FIG. 6B). For example, even if the error of the transport timing occurs, the CPU 42 can suppress the amount of the error.

Since the CPU 42 applies electric current to the paper feed sensor 24 only for two periods of F1*s* and F1*e*, the MFP 10 obtains power saving.

(b) Driving of Power Source of Resist Sensor 28

FIG. 8D illustrates a timing of a resist sensor power source driving signal of the resist sensor 28. FIG. 8E illustrates an example of a timing of a signal output by the resist sensor 28. FIG. 8F illustrates a timing of a signal for driving the resist motor 62*d*.

The CPU 42 measures a time T2*a'* (FIG. 8D), with reference to the paper feed timing by the paper feed motor 62*b* (FIG. 8A). The CPU 42 switches the resist sensor power source driving signal from "high" to "low".

As shown in FIG. 8E, the CPU 42 monitors the sensor output in the period of F2*s*. The CPU 42 confirms the result about whether the leading edge of the sheet is detected at the time point e3 before the period F2*s* ends.

As shown in FIG. 8D, after a time T2*b'* elapses from the time point e3 shown in FIG. 8E, the CPU 42 switches the resist sensor power source driving signal from "low" to "high". The electric power supply to the resist sensor 28 is cut off.

As shown in FIG. 8F, the CPU 42 turns on the driving of the resist motor 62*d* after a time T2*e'* elapses from the time point e3. The timer 59 starts the period F2*e* (FIG. 8E) for detecting the trailing edge of the sheet after a time T2*c'* elapses from the driving start of the resist motor 62*d*.

Next, the CPU 42 detects the trailing edge of the sheet.

As shown in FIG. 8E, the CPU 42 confirms the result regarding whether the trailing edge of the sheet is detected at a time point e4.

After a time T2*d'* elapses from the time point e4, the CPU 42 switches the resist sensor power source driving signal (FIG. 8D) from "low" to "high". The electric power supply to the resist sensor 28 is cut off.

The CPU 42 can easily generate the timing when electric power is supplied to the resist sensor 28 by the driving timing of the paper feed motor 62*b*. It is easy to manage the timing.

Since the CPU 42 applies electric current to the resist sensor 28 only for two periods of F2*s* and F2*e*, the MFP 10 obtains power saving.

(c) Driving of Power Source of Paper Ejection Sensor 29

FIG. 8G illustrates a timing of a paper ejection sensor power source driving signal. FIG. 8H illustrates an example of a timing of a signal output by the paper ejection sensor 29. FIG. 8I illustrates a timing of a signal for driving the paper ejection motor 62*c*.

The CPU 42 measures a time T3*a'* (FIG. 8G), with reference to the paper feed timing by the resist motor 62*d* (FIG. 8F). The CPU 42 switches the paper ejection sensor power source driving signal from "high" to "low".

As shown in FIG. 8H, the CPU 42 monitors the sensor output in the period of F3*s*. The CPU 42 confirms the result regarding whether the leading edge of the sheet is detected at a time point e5 before the period F3*s* ends.

After a time T3*b'* elapses from the time point e5, the CPU 42 switches the paper ejection sensor power source driving signal from "low" to "high". The electric power supply to the paper ejection sensor 29 is cut off.

As shown in FIG. 8H, the CPU 42 turns on the power source of the paper ejection sensor after a time T3*c'* elapses from the end of a time F3*s*. The period F3*e* is started.

Next, the CPU 42 detects the trailing edge of the sheet.

The CPU 42 confirms the result regarding whether the CPU 42 detects the trailing edge of the sheet at a time point e6.

After a time T3*d'* elapses from the time point e6, the CPU 42 switches the paper ejection power source driving signal from "low" to "high". The electric power supply to the paper ejection sensor 29 is cut off.

Since the CPU 42 generates the timing when electric power is supplied to the paper ejection sensor 29 by the driving timing of the resist motor 62*d*, it is easy to control the timing.

Since the CPU 42 applies electric current to the paper ejection sensor 29 only for the two periods of F3*s* and F3*e*, the MFP 10 obtains power saving.

The control section 18 or the CPU 42 determines the timing when the paper feed sensor power source driving signal is turned off on the basis of the time point e1, but the CPU 42 may determine the timing on the basis of the end timing of the time T1*a*.

Further, the CPU 42 may use the timing when firmware (F/W) performs detection as the reference. The CPU 42 may output a signal indicating the second timing, tens of milliseconds before or after the first timing.

Further, the CPU 42 may use status information as a trigger of the image forming start. The RAM 44 stores the status information in the apparatus. The CPU 42 may start the image formation if the state transits to a specific status.

Furthermore, the control section 18 may validate or invalidate the on and off control of the electric power supply to the paper feed sensor 24, the resist sensor 28 and the paper ejection sensor 29. The control section 18 obtains transport speed information on the sheet from the transport mechanism 16. The transport mechanism 16 monitors the motor speed.

For example, when plain paper is printed on, if the frequency that the paper feed sensor 24, the resist sensor 28 and the paper ejection sensor 29 are turned on or off is high and the transport speed is high, the control through the control section 18 may become frequent.

When the transport speed information exceeds a threshold value stored in advance, the control section 18 controls the sensor power source driving circuits 51a, 51b and 51c, and may constantly apply electric current by invalidating the on and off control of the electric power supply to the paper feed sensor 24, the resist sensor 28 and the paper ejection sensor 29.

For example, when thick paper is printed on, the control section 18 makes the transport speed slow, compared with that of the plain paper, to transport the thick paper. When the transport speed is made slower than that of the plain paper, the periods become long in which the detections through the paper feed sensor 24, the resist sensor 28, and the paper ejection sensor 29 become unnecessary. In this case, the control section 18 validates the on and off control of the electric power supply to the paper feed sensor 24, the resist sensor 28, and the paper ejection sensor 29.

The speed which toner is dissolved by the fixing unit 38 is changed according to the plain paper and the thick paper. The MFP 10 changes the transport speed according to the paper type. The timings when the paper feed sensor 24, the resist sensor 28, and the paper ejection sensor 29 are turned on and off are changed. Stabilization of the control is obtained.

Further, the control section 18 may validate or invalidate the on and off control of the electric power supply to the paper feed sensor 24, the resist sensor 28 and the paper ejection sensor 29, according to the sheet size or the paper feed cassette 19. The control section 18 validates or invalidates of the on and off control of the electric power, by identification information on the paper feed cassette 19 which is being used or the sheet size information.

(Modifications)

The sheet sensors in the first and second embodiments may use a different detection type element.

(1) The paper feed sensor 24 may use a reflective type photo sensor instead of the photo-interrupter with an actuator.

Figure 9:
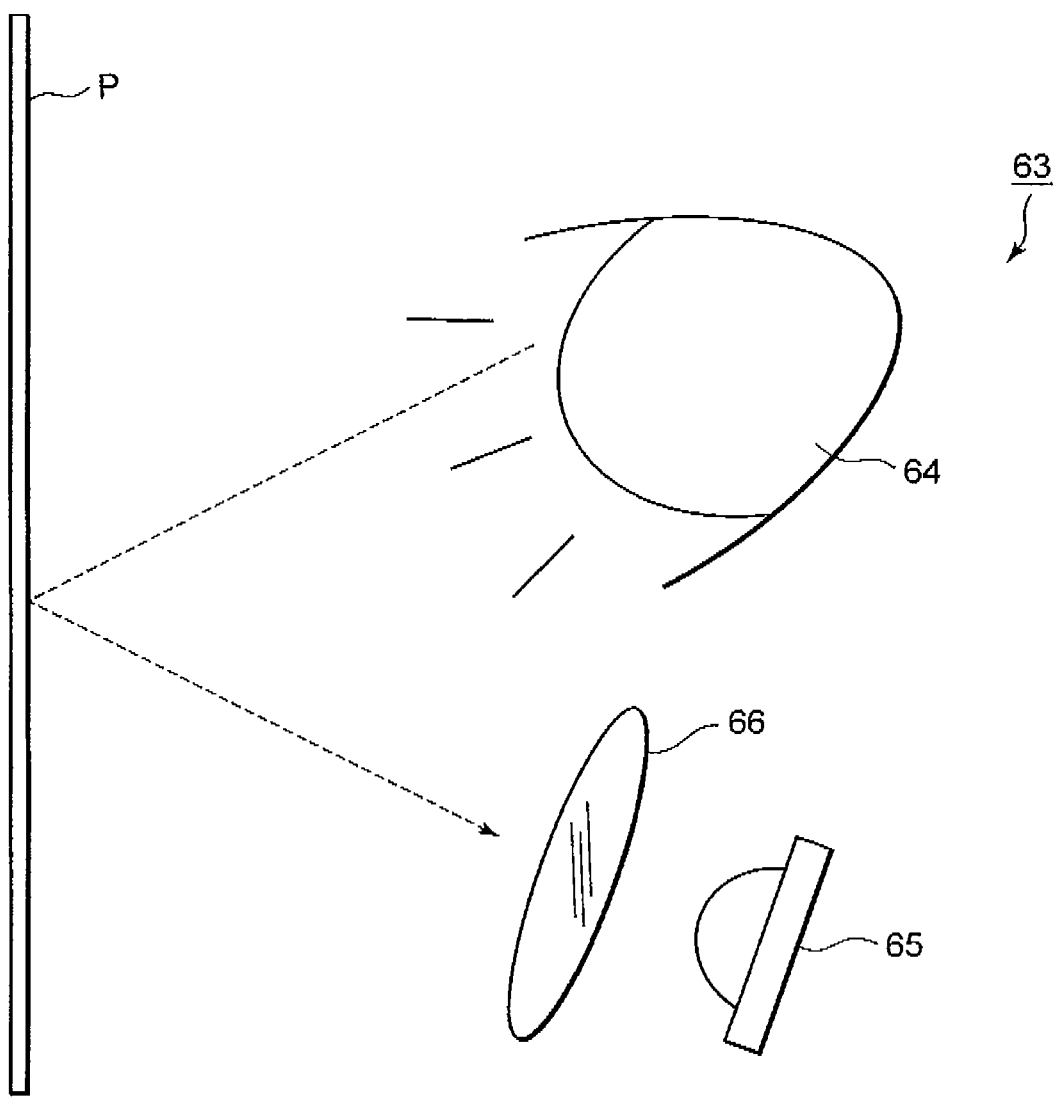
FIG. 9 is a diagram illustrating a first modified configuration example of the sheet sensor used in the image forming apparatus according to the first embodiment.

FIG. 9 is a diagram illustrating a configuration of the reflective type photo sensor.

A photo sensor 63 includes a light emitting section 64 having a light emitting diode, a light receiving section 65 having a photo transistor, and a lens 66.

The light emitting section 64 emits light beams to the sheet P. The lens 66 focuses the reflected light from the sheet P. The light receiving section 65 receives the focused light. The light receiving section 65 outputs electric current of the amount according to the intensity of the received light.

When the sheet P is disposed in a position where the light beams from the light emitting section 64 do not reach, the light is not reflected in the sheet P. The light receiving section 65 does not output electric current.

When the sheet P is disposed in a position where the light beams from the light receiving section 64 reaches, the light is reflected from the sheet P. The reflected light is incident toward the light receiving section 65. The light receiving section 65 outputs a large electric current.

The CPU 42 detects the presence or absence of the sheet P according to the size of a detection signal from the light receiving section 65.

The resist sensor 28 and the paper ejection sensor 29 may use the reflective type photo sensor 63.

(2) The paper feed sensor 24 may use a separation type photo sensor.

Figure 10:
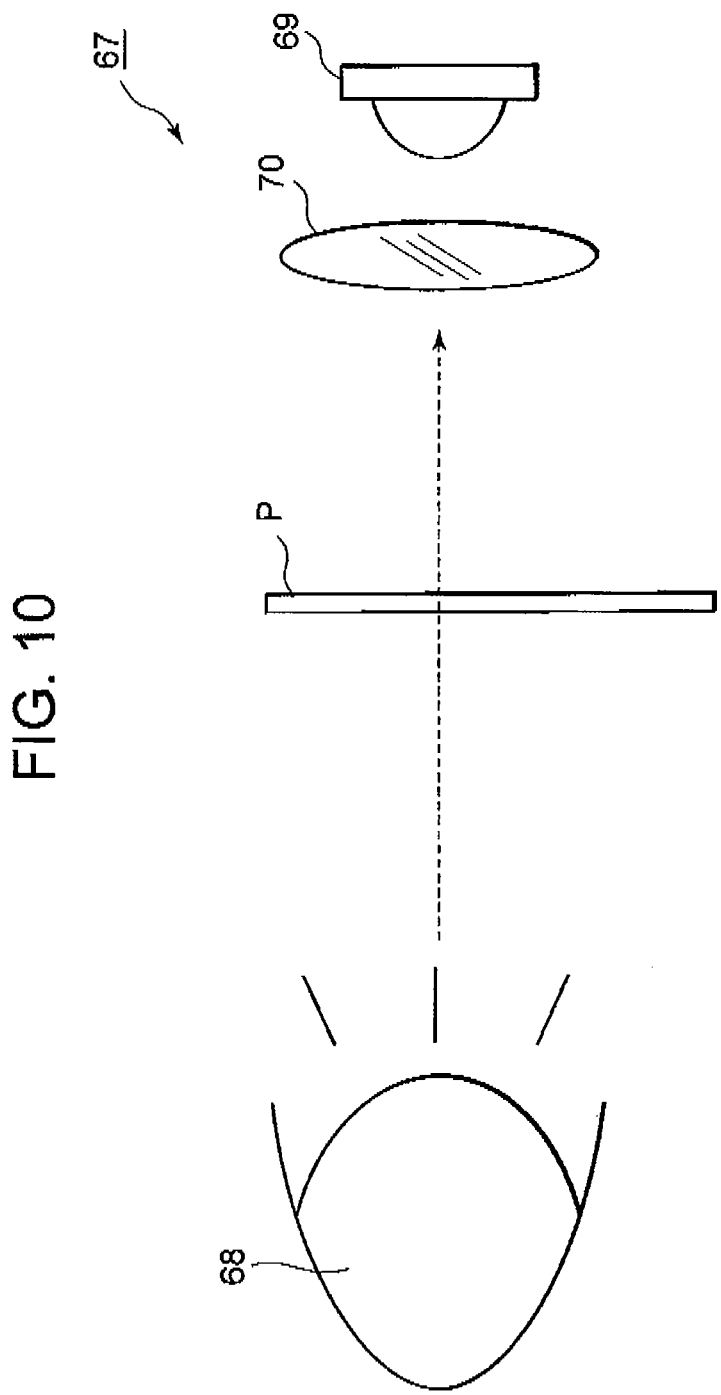
FIG. 10 is a diagram illustrating a second modified configuration example of the sheet sensor used in the image forming apparatus according to the first embodiment.

FIG. 10 is a diagram illustrating a configuration example of the separation type photo sensor.

The photo sensor 67 includes a light emitting section 68 having a light emitting diode, a light receiving section 69 having a photo sensor, and a lens 70.

The light emitting section 68 emits light beams to the sheet P. The lens 70 focuses the light which passes through the sheet P. The light receiving section 69 receives the focused light. The light receiving section 69 outputs electric current of the size according to the intensity of the received light.

When the sheet P is not disposed between the light emitting section 68 and the light receiving section 69, the photo sensor 67 directs the light from the light emitting section 68 toward the light receiving section 69. The light receiving section 69 outputs a large electric current.

When the sheet P is disposed between the light emitting section 68 and the light receiving section 69, the light is blocked by the sheet P. The light receiving section 69 does not output the electric current.

The CPU 42 detects the presence or absence of the sheet P by the size of a detection signal from the light receiving section 69.

The resist sensor 28 and the paper ejection section 29 may also use the separation type photo sensor 63.

(3) The CPU 42 may share the timings when electric power is respectively supplied to the paper sheet sensor 24, the resist sensor 28 and the paper ejection sensor 29, between the paper sheet sensor 24, the resist sensor 28 and the paper ejection sensor 29.

(4) The MFP 10 has the sensor power source driving circuits 51a, 51b and 51c for each sensor, but the MFP 10 may share the sensor power source driving circuits 51a, 51b and 51c, between the paper sheet sensor 24, the resist sensor 28 and the paper ejection sensor 29.

(5) Others

FIG. 2 is an example of the configuration. The type or the number of target rollers rotated by the motors 62a, 62b, 62c and 62d may be changed. The power of the motors maybe shared between the transport rollers 23, the resist rollers 27 and the transport rollers 26.

The power generated by the motors may be distributed by clutches or gears. The motor driving circuit may be shared between the plurality types of motors.

The functions of the sensor power source control modules 53a, 53b and 53c may be realized by the firmware.

The functions of the motor driving modules 61a, 61b and 61c may be realized by the LSI or the exclusive IC, but the motor driving modules 61a, 61b and 61c may be realized by the firmware.

The advantages of the image forming apparatus according to the embodiment can be also applied to modifications of the configuration in FIG. 2.

In the above-described embodiments, the image forming apparatus is the MFP 10, but the image forming apparatus may be a printer or a copy machine.

The MFP 10 may have sheet sensors which are different from the paper feed sensor 24, the resist sensor 28, the paper ejection sensor 29 in a variety of positions. The number of the sensors may be changed.

While certain embodiments have been described, these embodiments have been presented by way of example only, and are not intended to limit the scope of the inventions. Indeed, the novel methods and systems described herein may be embodied in a variety of other forms; furthermore various omissions and substitutions and changes in the form of methods and systems described herein may be made without departing from the spirit of the inventions. The accompanying claims and their equivalents are intended to cover such forms or modifications as would fall within the scope and spirits of the inventions.

What is claimed is:

1. An image forming apparatus comprising:
   a paper feed section configured to set a plurality of sheets;
   an image forming section configured to form an image on the sheet;
   a mechanism configured to transport the sheet in a transport path defined from the paper feed section to a sheet paper ejection port through the image forming section;
   a sheet sensor configured to detect a leading edge and a trailing edge of the sheet in the transport path;
   a sensor power source configured to supply electric power to the sheet sensor;
   a detecting section configured to specify the position of the sheet transported by the mechanism based on the position of the sheet sensor in the transport path and a detection output from the sheet sensor; and
   a driving control section configured to generate a timing signal indicating a first detection period when a leading edge of the sheet is detected and a timing signal indicting a second detection period when a trailing edge of the sheet is detected, by the sheet position, turn on the sensor power source in the first detection period and the second detection period, and turn off the sensor power source in a period different from the respective detection periods.

2. The apparatus of claim 1,
   wherein the sheet sensor includes:
   a paper feed sensor configured to detect the sheet which is picked up from the paper feed section;
   a resist sensor configured to detect the sheet between the paper feed section and an image forming process section; and
   a paper ejection sensor configured to detect the sheet between a fixing unit and the sheet ejection port, and
   the driving control section individually turns on electric power supplied to the paper feed sensor, the resist sensor and the paper ejection sensor at timings when the leading edge of the sheet reaches the paper feed sensor, the resist sensor, and the paper ejection sensor, and individually turns off the electric power supplied to the paper feed sensor, the resist sensor and the paper ejection sensor at the timings when the trailing edge of the sheet moves away from the paper feed sensor, the resist sensor and the paper ejection sensor.

3. The apparatus of claim 2,
   wherein the driving control section uses at least one of the time when the image forming process section starts image forming and the time when the leading edge or the trailing edge of the sheet is definitely detected, as a reference of the timings when the electric power is respectively supplied.

4. The apparatus of claim 2,
   wherein the driving control section shares the timings when the electric power is respectively supplied between the paper feed sensor, the resist sensor and the paper ejection sensor.

5. The apparatus of claim 2, further comprising:
   a first power source driving circuit configured to drive the electric power supply to the paper feed sensor;
   a second power source driving circuit configured to drive the electric power supply to the resist sensor; and
   a third power source driving circuit configured to the electric power supply to the paper ejection sensor.

6. The apparatus of claim 5,
   wherein the first power source driving circuit, the second power source driving circuit, and the third power source driving circuit are shared between the paper feed sensor, the resist sensor and the paper ejection sensor.

7. The apparatus of claim 1,
   wherein the driving control section obtains transport speed information on the sheet from the mechanism, and validates or invalidates the sensor power source by the transport speed information.

8. The apparatus of claim 1,
   wherein the driving control section obtains sheet type information on the sheet, and validates or invalidates the sensor power source by the sheet type information.

9. The apparatus of claim 1,
   wherein the driving control section obtains size information on a paper feed cassette from the paper feed section, and validates or invalidates the sensor power source by the size information.

10. The apparatus of claim 1,
    wherein the sheet sensor is substantially an actuator type photo-interrupter.

11. The apparatus of claim 1,
    wherein the sheet sensor is substantially a reflection type photo sensor.

12. The apparatus of claim 1,
    wherein the sheet sensor is substantially a separation type photo sensor.

13. A electric power supply control method comprising:
    turning on electric power supply to a sheet sensor to which electric power is not supplied;
    detecting a leading edge of the sheet by the sheet sensor in a first detection period;
    turning off the electric power supply to the sheet sensor;
    turning on the electric power supply to the sheet sensor and detecting a trailing edge of the sheet by the sheet sensor in a second detection period; and
    turning off the electric power supply to the sheet sensor.

14. The method of claim 13, further comprising:
    turning on the electric power supply to a paper feed sensor to which electric power is not supplied, and detecting the leading edge of the sheet in a third detection period by the paper feed sensor;
    turning off the electric power supply to the paper feed sensor;
    turning on the electric power supply to the paper feed sensor, and detecting the trailing edge of the sheet by the paper feed sensor in a fourth detection period; and
    turning off the electric power supply to the paper feed sensor.

15. The method of claim 13, further comprising:
    turning on the electric power supply to a resist sensor to which the electric power is not supplied, and detecting the leading edge of the sheet in a fifth detection period by the resist sensor;

turning off the electric power supply to the resist sensor;
turning on the electric power supply to the resist sensor, and detecting the trailing edge of the sheet by the resist sensor in a sixth detection period; and
turning off the electric power supply to the resist sensor.

16. The method of claim 13, further comprising:
turning on the electric power supply to a paper ejection sensor to which the electric power is not supplied, and detecting the leading edge of the sheet in a seventh detection period by the paper ejection sensor;
turning off the electric power supply to the paper ejection sensor;
turning on the electric power supply to the paper ejection sensor, and detecting the trailing edge of the sheet by the paper ejection sensor in an eighth detection period; and
turning off the electric power supply to the paper ejection sensor.

17. The method of claim 13,
wherein the timing when the electric power supply to the sheet sensor is at least one of the time when image forming is started and the time when the leading edge or the trailing edge of the sheet is definitely detected.

18. The method of claim 13,
wherein the turning on and off driving of the electric power supply is validated or invalidated by transport speed information on the sheet.

19. The method of claim 13,
wherein the turning on and off driving of the electric power supply is validated or invalidated by sheet type information on the sheet.

20. The method of claim 13,
wherein the turning on and off driving of the electric power supply is validated or invalidated by size information on a paper feed cassette.

* * * * *